United States Patent

Tanaka et al.

Patent Number: 5,418,287
Date of Patent: May 23, 1995

[54] RESIN COMPOSITION COMPRISING A POLYPHENYLENE ETHER COMPOSITION, POLYOLEFIN AND A STYRENE GRAFT MODIFIED COPOLYMER

[75] Inventors: Tomohiko Tanaka; Hiroshi Nakano; Hiroyuki Satoh; Shiroh Gotoh, all of Yokkaichi, Japan

[73] Assignee: Mitsubishi Petrochemical Company, Ltd., Tokyo, Japan

[21] Appl. No.: 179,497

[22] Filed: Jan. 10, 1994

Related U.S. Application Data

[62] Division of Ser. No. 858,021, Mar. 26, 1992, abandoned.

[30] Foreign Application Priority Data

Mar. 27, 1991 [JP] Japan .................. 3-63364

[51] Int. Cl.$^6$ .............. C08F 255/02; C08L 23/00; C08L 23/14; C08L 71/12
[52] U.S. Cl. ................... 525/68; 525/132; 525/905
[58] Field of Search ............ 525/68, 132, 905

[56] References Cited

U.S. PATENT DOCUMENTS

| | | | |
|---|---|---|---|
| 4,987,193 | 1/1991 | Gotoh | 525/314 |
| 5,132,363 | 7/1992 | Furuta et al. | 525/68 |
| 5,268,425 | 12/1993 | Furuta et al. | 525/68 |

*Primary Examiner*—Thomas Hamilton, III
*Attorney, Agent, or Firm*—Oblon, Spivak, McClelland, Maier & Neustadt

[57] ABSTRACT

A resin composition comprising the following component A, component B and component C:
component A of polyphenylene ether resin; component B of crystalline polyolefin resin; and component C of graft modified copolymer in which an unsaturated copolymer consisting of ethylene or at least one of α-olefins having 3 to 12 carbon atoms and at least one of chain nonconjugated dienes of the following general formula is modified with a monomer capable of radical polymerization such as styrene.

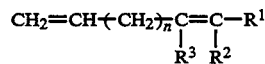

This resin composition has an improved impact strength, keeping heat resistance and mechanical strength characteristic of polyphenylene ether resins, and molding properties and resistance to organic solvents characteristic of polyolefin resins.

8 Claims, No Drawings

RESIN COMPOSITION COMPRISING A POLYPHENYLENE ETHER COMPOSITION, POLYOLEFIN AND A STYRENE GRAFT MODIFIED COPOLYMER

This is a division of application Ser. No. 07/858,021, filed on Mar. 26, 1992, now abandoned.

BACKGROUND OF THE INVENTION

1. Field of the Invention

The present invention relates to a resin composition with excellent molding properties, mechanical strength, impact resistance and the like. More particularly, the present invention relates to a resin composition comprising (A) a polyphenylene ether resin, (B) a polyolefin resin and (C) a graft modified copolymer modified with a specified monomer which is capable of radical graft polymerization under the conditions of radical graft polymerization. The composition provides molding articles which satisfy highly required performance of structural components and the like of automobiles and electrical equipment, in which heat resistance and mechanical strength characteristic of polyphenylene ether resins, and molding properties and resistance to organic solvents characteristic of polyolefin resins are not greatly reduced, with their impact resistance being improved remarkably.

2. Discussion of the Background

It is well known that a polyphenylene ether resin consisting of ring-unsubstituted or ring-substituted phenylene groups, particularly poly-2,6-dimethyl-1,4-phenylene ether, which is excellent in heat resistance and mechanical strength, is useful for engineering resins. For use as a molding material, however, the polyphenylene ether resin-has poor stability for injection molding, extrusion molding and the like. Further, polyphenylene ether resins has poor impact resistance, solvent resistance for engineering resins in a variety of application fields.

There is a well-known idea that an approach to blending other resin materials compensates for insufficient properties when a single resin material does not enough satisfy various desired properties. Materials of polyphenylene ether having improved molding properties by compounding polystyrene are widely provided for practical use, which has suitable molding properties and compatibility with polyphenylene ether. In this case, both components have poor resistance to organic solvents and thus the blended composition should be insufficient for solvent resistance. On the other hand, a polyolefin resin which is inexpensive as well as excellent in molding properties, resistance to organic solvents and the like has been used as materials for molded objects, but does not meet the needs of engineering resins, because its heat resistance is not high enough.

If a composition which combines the good properties of a polyphenylene ether resin and a polyolefin resin together is obtained, an excellent resin material having a wide application field can be provided.

However, as can be understood from a thermodynamic discussion of a general polymer blends, polyphenylene ether is incompatible with polyolefin and there is no affinity between the former and the latter. Therefore, a composition blended with only two components has poor adhesion properties in the boundary of the two-phase structure, so that the boundary of two-phase of molded objects obtained will become defective parts having low strength and will tend to reduce the mechanical strength and impact resistance. The boundary part is easily delaminated when subjected to shearing stress during the molding process such as injection molding and the like.

Generally, one of the possible approaches to resolve the above mentioned problems in an incompatible polymer blend is blending a third component to improve affinity of the desired two-component composition.

A material referred to as a compatibilizing agent is the representative third component. It is ideal that a compatibilizing agent is laid in the interface of the first component and the second component, exhibits affinity to the both components, improves the poor adhesion properties, and leads to be capable of making more homogeneous dispersion structure. For example, Japanese Patent Laid-Open No. 58-103557 describes that a block or radical tereblock copolymer of an alkenyl aromatic compound and a conjugated diene acts as "a compatibility imparting agent", and that polyolefin is blended homogeneously with polyphenylene ether in an appropriate ratio. Japanese Patent Publication No. 56-22344 describes a method for preventing reduction of mechanical strength of unmodified polypropyrene to be used by compounding modified polypropyrene, i.e., polypropyrene modified with a styrene monomer and an organic peroxide to polyphenylene ether. When large amount of polyphenylene ether and large amount of unmodified polypropyrene, however, are compounded, the use of such a conventional compatibility imparting agent does not lead to satisfactory results as an affinity modifying agent.

The present invention provides a resin composition which is excellent in heat resistance, solvent resistance and molding properties, and which has high impact resistance.

SUMMARY OF THE INVENTION

It has already been found that a propylene copolymer modified with monomers of styrene series is useful as an affinity modifier in a composition comprising a polyphenylene ether resin and polyolefin resin, wherein said propylene copolymer modified with monomers of styrene series is obtained by polymerizing monomers of styrene series and crystalline propylene copolymer provided by copolymerization of propylene as a main component with small parts of 4-methyl-1,4-hexadiene and 5-methyl-1,4-hexadiene. The affinity modifier prevents reduction of performance, particularly reduction of impact resistance of the above mentioned incompatible blend materials due to poor affinity of two components, which is general disadvantage of the materials, while inducing the characteristics of the component resins, such as heat resistance of a polyphenylene ether resin, and molding properties and resistance to organic solvents of a polyolefin resin (Japanese Patent Laid-Open No. 63-128013).

As a result of further intensive research to greatly improve impact resistance, the present inventors have found that impact resistance of a resin composition is remarkably improved by using a chain nonconjugated diene having the following general formula (1), where n is an integer of 2 to 10 to achieve the present invention.

That is, a resin composition according to the present invention is a composition with excellent molding properties, mechanical strength, heat resistance, resistance to organic solvents, and in particular impact resistance, wherein the invention comprises the following components A, B and C:

component A: 10 to 90 parts by weight of a resin consisting of 40 to 100% by weight of a polyphenylene ether resin and 0 to 60% by weight of a styrene series resin;

component B: 10 to 90 parts by weight of a crystalline polyolefin resin; and component C: 1 to 50 parts by weight of a graft modified copolymer relative to a total amount of 100 parts by weight of the component A and component B, in which 100 parts by weight of an unsaturated copolymer consisting of ethylene or at least one α-olefin having 3 to 12 carbon atoms and at least one chain nonconjugated diene of the following general formula 1, the chain nonconjugated diene contents being 0.05 to 50 mole %, is modified with 1 to 300 parts by weight of a monomer which is capable of radical polymerization under the conditions of radical graft polymerization,

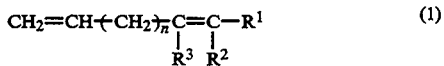
(1)

wherein n is an integer from 2 to 10, $R^1$ represents an alkyl group having 8 or less carbon atoms, and $R^2$ and $R^3$ represent independently hydrogen or an alkyl group having 8 or less carbon atoms.

DETAILED DESCRIPTION OF THE INVENTION

The present invention is further illustrated in connection with the following description.

Component A: polyphenylene ether resins

Polyphenylene ether resins to be used in the present invention are already known. The polyphenylene ethers to be used in the present invention have the repeated structural units of the following general formula 2,

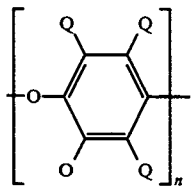
(2)

wherein an oxygen atom of ether in a unit is combined to a benzene nucleus of an adjacent unit; n is at least an integer of 10; and Q represents independently a monovalent substituted group selected from the group consisting of hydrogen, halogen, a hydrocarbon group without a tertiary α-carbon atom, a halohydrocarbon group having at least 2 carbon atoms between a halogen atom and a phenyl nucleus, a hydrocarbon oxy group and a halohydrocarbon oxy group having at least 2 carbon atoms between a halogen atom and a phenyl nucleus.

Representative monomers include phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2,3,5-, 2,3,6- or 2,4,6-trimethylphenol, 2-methyl-6-t-butylphenol and the like. These compounds as main components can be used with multivalent hydroxyaromatic compounds such as bisphenol A, tetrabromobisphenol A, resorcin, hydroquinone, 2,2-bis(3,5-dimethyl-4-hydroxy)propane, bis(3,5-dimethyl-4-hydroxy)methane and 4,4'-dihydroxybiphenyl as a copolymerization component.

The well-known method for preparing the polymer is described, for example, in U.S. Pat. Nos. 3,306,874, 3,306,875, 3,257,375 and 3,257,358. Catalysts used in oxdative polymerization are not intended to be particularly limited, but any catalyst may be used by which the desired degree of polymerization is obtained. A variety of catalyst systems such as cuprous salt/amine, cupric salt/amine/alkaline metal hydroxide, manganese salt/primary amine and the like are well-known in this field.

Polymers can be also used in which polymers of the styrene series resin described in Japanese Patent Publication No. 47-47862, Japanese Patent Publication No. 48-12197 and the like are grafted to the polymers according to the present invention.

Furthermore, polymers can be used in which parts of the polymer components are modified with catalysts, polymerization solvents and the like, or modified by heat, oxygen and the like in the process of production and molding.

Particularly preferred polymers of component A according to the present invention are those comprising one or more monomers selected from the group consisting of poly-2,6-dimethyl-1,4-phenylene ether, a great part of 2,6-dimethyphenol and a small part of 2,3,6-trimethylphenol, o- or p-cresol, 2,2'-bis(3,5-dimethyl-4-hydroxy)propane, and 3,3',5,5'-tetramethyl-4,4'-dihydroxybisphenyl.

Although a range of degree of polymerization is not limited in particular, the polymers have an intrinsic viscosity of about 1.0 dl/g for a practical upper limit, preferably 0.1 to 0.9 dl/g, and more preferably 0.2 to 0.8 dl/g at a temperature of 30° C. in a chloroform solution as a preferred indication in view of molding properties. Since much higher degrees of polymerization of the resins increase their melting viscosity, molding processes must be performed at higher temperatures and special preventive means for heat deterioration of the polymers are needed. If the degree of polymerization is too low, the mechanical strength is deteriorated.

Furthermore, polyphenylene ether resins according to the present invention may be blended with 60% by weight or less of styrene series resins. Examples of the styrene series resins include polystyrene, rubber toughened polystyrene such as high impact polystyrene and the like, poly-α-methylstyrene, styrene/maleic anhydride copolymer, styrene/phenylmaleimide copolymer, styrene/(m)acrylic copolymer, styrene/butadiene copolymer, styrene/acrylonitrile copolymer, ABS resin and the like. Blending of styrene series resins can reduce the melting viscosity of polyphenylene ether resins. As a result, the molding properties of the composition can be improved, though heat resistance of the polyphenylene ether resins generally decreases in accordance with increases in the blending ratio of the styrene series resins. A homopolymer of a styrene series monomer which is produced during preparation of component C to be described hereinafter may be used as a styrene series resin at the above mentioned predetermined ratio of a polyphenylene ether resin.

Component B: crystalline polyolefin resins

Polyolefin resins to be used in the present invention are also already known. Polyethylene, polypropylene(-propylene homopolymer), and a propylene/ethylene or propylene/α-olefin copolymer comprising propylene as a main component may be used as preferred polyolefin resins, whose degree of crystallization is 5% or more, and preferably 10–70%.

One or more α-olefins selected from the group consisting of 1-butene, 1-pentene, 1-hexene, 3-methyl-1-butene, 3-methyl-1-pentene and 4-methyl-1-pentene can be used. Furthermore, polypropylene, a propylene-/ethylene copolymer or a propylene/α-olefin copolymer may be used which contains 20% or less by weight, preferably 10% or less by weight of vinylaromatic compounds such as styrene and methylstyrene, vinylsilane compounds such as vinyltrimethoxysilane and vinyltriethoxysilane, unsaturated fatty acids and derivatives thereof such as maleic acid, maleic anhydride and acrylic acid, nonconjugated diene compounds such as dicyclopentadiene, 4-ethylidene-2-norbornene and 4-methyl-1,4-hexadiene. Furthermore, a mixture of polyethylene and other α-olefin polymers and the above mentioned polypropylene, a propylene/ethylene copolymer or a propylene/α-olefin copolymer may be used in which the propylene content is 30% or more by weight, preferably 50% or more by weight, and the degree of crystallization resulting from propylene units is 5% or more, preferably 10% or more. Such preferred examples of α-olefin polymers include one or more polymers such as polybutene-1, poly-4-methyl-1-pentene, an ethylene/propylene or ethylene/propylene/butene copolymer whose propylene content is less than 50% by weight and an ethylene/butene copolymer. Polyethylene and an α-olefin polymer may be prepared together in the polymerization process of propylene resin, and may be blended with any of components prior to compounding the final composition. These components may be added during blending of the final composition at the same time.

In the present invention a crystalline polyolefin resin can contain a rubber-like polymer. The rubber-like polymer may be produced together in the polymerization process of polypropylene resins, or blended with other rubber-like polymers prepared independently. As polyolefin resins containing rubber-like polymer the following polymers are utilized: a propylene/ethylene block copolymer which has a propylene content of 99 to 70% by weight; a propylene/ethylene random copolymer which has a propylene content of 99.9 to 80% by weight; and polypropylene or the above mentioned propylene/ethylene copolymer in which an ethylene/propylene rubber, an ethylene/propylene/butene gum or an ethylene/butene rubber is subjected to milling.

It is desirable that a rubber-like polymer has a ratio of 0 to 40% by weight relative to 100 to 60% by weight of a crystalline polyolefin resin.

To maintain heat resistance of the final resin composition at a high level, it is preferable that crystallizability and crystal-melting temperature of polyolefin resins are as high as possible. Increased ratios of components which are copolymerized with propylene in a propylene copolymer can reinforce impact resistance of the final composition but cause reductions in the degree of crystallization and/or melting temperature. A suitable polyolefin resin must be selected in view of these properties required in the final composition.

Component C: graft modified copolymers

Unsaturated copolymers which constitute their main chains of graft modified copolymers used in the present invention are copolymers of ethylene or at least one of α-olefins having 3 to 12 carbon atoms and a chain nonconjugated diene of the following general formula 1, a chain nonconjugated diene content being 0.05 to 50 mole

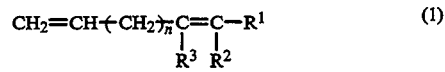

wherein n is an integer of 2 to 10, $R^1$ represents an alkyl group having 8 or less carbon atoms, and $R^2$ and $R^3$ represent independently hydrogen or an alkyl group having 8 or less carbon atoms.

Unsaturation properties of these unsaturated copolymers will be due to groups of the following formula which are suspended from copolymer chains through an alkylene group which is not involved copolymerization with α-olefin.

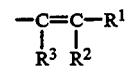

These unsaturated copolymers have crystallizability, which is shown from the results that their degrees of crystallization are 10% or more, and preferably 20 to 70% by X-ray analysis.

These unsaturated copolymers may further contain a small amount of comonomer (up to about 15 mole %) relative to a total amount of the above mentioned both monomers.

These unsaturated copolymers should have sufficiently high molecular weight and/or melting points for utilization as resins, in general, their molecular weight being 3000 or more as indicated by the number-average molecular weight, and their melting points being 40° C. or more.

[Ethylene and α-olefins]

Examples of the above mentioned ethylene and α-olefins which are each one of the components of the unsaturated copolymers include ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allycyclhexene, allylbenzene, 3-cyclohexyl-1-butene, vinylcyclopropane, vinylcyclohexane, 2-vinylbicyclo[2,2,1]-heptane and the like. Preferred examples of them include ethylene, propylene, 1-butene, 1-hexene, 3-methyl-1-butene, 3-methyl-1-pentene, 4-methyl-1-pentene, 3-methyl-1-hexene and the like, and particularly ethylene, propylene, 1-butene, 3-methyl-1-butene and 4-methyl-1-pentene. Out of these ethylene and α-olefins one or more compounds may be used. In particular, when 1-hexene is selected as an α-olefin, it is preferred to use it concomitantly with at least one compound out of ethylene, propylene, 1-butene, 4-methyl-1-pentene and 3-methyl-1-butene. When two or more ethylene and α-olefins are used, the olefins may be distributed randomly or in the form of a block in an unsaturated copolymer.

[Chain nonconjugated dienes]

The chain nonconjugated dienes of the above mentioned general formula (1) are compounds in which n is an integer of 2 to 5, $R^1$ represents an alkyl group having 8 or less carbon atoms, and $R^2$ and $R^3$ represent independently hydrogen or an alkyl group having 1 to 4 carbon atoms, and more preferably n is 3, $R^1$ represents an alkyl group having 1 to 3 carbon atoms, and $R^2$ and $R^3$ represent independently hydrogen or an alkyl group having 1 to 3 carbon atoms.

As mentioned above unsaturated bonds to be used for modifying monomers capable of radical polymerization under the conditions of radical graft polymerization are considered to be a chain nonconjugated dienes of the following general formula, where the unsaturated bond is suspended from the copolymer chain through an alkylene chain $(CH_2)_n$.

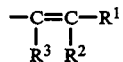

In the present invention the compounds have an alkylene chain in which n is an integer from 2 to 10, preferably 2 to 5, and more preferably 3. When n is less than 2, the graft efficacy of the radical graft reaction of monomers capable of radical polymerization to an unsaturated copolymer in which the chain nonconjugated diene is one of the components is remarkably lower than that of the polymerization to an unsaturated copolymer in which the chain nonconjugated diene is one of the components in the case that n is 2 or more. Irrespective of any theoretical basis, it is presumed that when n is 2 or less, the reactivity of the olefinic unsaturated bond should decrease because the olefinic unsaturated bond in the unsaturated copolymer is present in the vicinity of the main chain of the polymer. On the other hand, when n is more than 10, the increased reactivity of the olefinic unsaturated bond is restrained, so that there are increasingly disadvantages in the graft modified copolymers from a physical and economic point of view.

Examples of such chain nonconjugated dienes include preferably chain 1,5-dienes such as 1,5-heptadiene, 1,5-octadiene, 5-methyl-1,5-heptadiene, 6-methyl-1,5-heptadiene and 2-methyl-1,5-hexadiene; chain 1,6-dienes such as 1,6-octadiene, 6-methyl-1,6-octadiene, 7-methyl1,6-octadiene, 2-methyl-1,6-heptadiene, 6-methylidene-1-octene, 6-ethyl-1,6-octadiene, 6,7-dimethyl-1,6octadiene, 1,6-nonadiene, 6-ethyl-1,6-nonadiene, 7-methyl-1,6-nonadiene and 7-methyl-1,6-decadiene; chain 1,7-dienes such as 1,7-nonadiene, 7-methyl-1,7-nonadiene, 8-methyl-1,7-nonadiene and 2-methyl-1,7-octadiene; and chain 1,8-dienes such as 8-methyl-1,8-decadiene and 9-methyl-1,8-decadiene.

Among them, 6-methyl-1,6-octadiene or 7-methyl-1,6-octadiene are particularly preferred examples.

These chain nonconjugated dienes may be utilized singly or two or more of them may be used concomitantly, and thus the suitable concomitant use of 6-methyl-1,6-octadiene and 7-methyl-1,6-octadiene (a weight ratio of 5:5 to 5:95) is included.

The unsaturated copolymers to be used in the present invention are prepared by copolymerizing these ethylene and α-olefins and chain nonconjugated dienes, with a Ziegler-Natta type catalyst for polymerization of ethylene and α-olefins using the same method and apparatus as in the preparation of α-olefin polymers.

These chain nonconjugated dienes may be distributed randomly or in the form of block in an unsaturated copolymer.

Preferred chain nonconjugated diene contents in these unsaturated copolymers are 0.1 to 30 mole %, particularly 0.5 to 15 mole %. In cases where less than 0.1 mole % of a chain nonconjugated diene is used, there are problems in that it is difficult to increase the graft efficacy and to obtain improved effects of compatibility or dispersibility and the like because unsaturated group content is low in the unsaturated copolymer. On the other hand, in cases where there is more than 30 mole % of a chain nonconjugated diene, there are problems in that the polymerization rate is slowed down when preparing the unsaturated copolymer, and in that a decreased polymerization rate and an increased amount of by-product polymers soluble in solvents for slurry polymerization cause stickiness or lead to unmaintainable resin forms of the unsaturated copolymer produced as well as poor productivity resulting from its raised polymeric viscosity.

Although the molecular weight of the unsaturated copolymer is not particularly limited as long as the copolymer maintains a resin form, in the case where an α-olefin consists mainly of propylene, for example, the molecular weight of the unsaturated copolymer will have corresponding values of generally 0.001 to 1000 grams per 10 minutes, preferably 0.01 to 500 grams per 10 minutes, and more preferably 0.05 to 100 grams per 10 minutes as melt flow rates (MFRs) measured on the basis of JIS-K-6758. Furthermore, the unsaturated copolymer preferably has a flexural molecules of 500 to 20,000 kg/cm² on the basis of JIS-K-7203.

The preferred type of unsaturated copolymers in a view of molecular structure are represented as follows.

(1) Random copolymers of one or more ethylenes or α-olefins and one or more chain nonconjugated dienes.

(2) Block copolymers consisting of one or more ethylenes or α-olefin polymeric blocks, and random copolymer blocks of one or more ethylenes or α-olefins and one or more chain nonconjugated dienes (the kinds and amount ratios of the olefin polymer blocks may be identical to or different from those of the olefins of the random copolymer blocks).

(3) Block copolymers consisting of a random copolymer block (block A) of a random copolymer of one or more ethylene or α-olefins and one or more chain nonconjugated dienes, and a random copolymer block (block B) of ethylene or α-olefins and chain nonconjugated dienes, the block B being different from block A in terms of at least the kind, number and amount ratio of olefins, or those of chain nonconjugated dienes.

The term "block copolymer" refers to the following copolymers. For example, "a block copolymer consisting of homopolymer blocks of monomer A, and random copolymer blocks of monomer A and monomer B" denotes a block copolymer comprising a copolymer (I) in which such the homopolymer blocks of monomer A are chemically combined with random copolymer blocks of monomer A and monomer B as in the form of A...A-AABABAAAAB..., or a mixture (II) consisting of a copolymer (I) and a random copolymer of monomer A and monomer B.

Furthermore, the term "block copolymer consisting of polymeric block a and polymeric block b" denotes a block copolymer (III) comprising a copolymer in which polymeric block a is chemically combined with polymeric block b, or a mixture (IV) consisting of a block copolymer (III) and a polymer consisting of only polymeric block a and a polymer consisting of only polymer b. Thus the term has the same meaning as a so-called "block copolymer" prepared with a Ziegler-Natta type catalyst.

Preferred examples of these unsaturated copolymers include (1) a random copolymer of propylene and 6-methyl-1,6-octadiene; (2) a random copolymer of propylene and 7-methyl-1,6-octadiene; (3) a random copolymer of propylene, 6-methyl-1,6-octadiene and 7-methyl-1,6-octadiene; (4) a random copolymer of propylene, ethylene and 6-methyl-1,6-octadiene or 7-methyl-1,6-octadiene; (5) a block copolymer consisting of a homopolymer block of propylene, and a random block of propylene and 6-methyl-1,6-octadiene or 7-methyl-1,6-octadiene; (6) a block copolymer consisting of a homopolymer block of propylene, and a random block of ethylene and 6-methyl-1,6-octadiene or 7-methyl-1,6-octadiene; (7) a block copolymer consisting of a homopolymer block of ethylene, and a random block of propylene and 6-methyl-1,6-octadiene or 7-methyl-1,6-octadiene; (8) a block copolymer consisting of a random copolymer block of propylene and ethylene, and a random copolymer block of propylene, ethylene and 6-methyl-1,6-octadiene or 7-methyl-1,6-octadiene; (9) a block copolymer consisting of a random copolymer block of ethylene and 6-methyl-1,6-octadiene or 7-methyl-1,6-octadiene, and a random copolymer block of propylene and 6-methyl-1,6-octadiene or 7-methyl-1,6-octadiene; (10) a block copolymer consisting of a random copolymer block of propylene and 6-methyl-1,6-octadiene or 7-methyl-1,6-octadiene, and a random copolymer block of propylene, ethylene and 6-methyl-1,6-octadiene or 7-methyl-1,6-octadiene; (11) a block copolymer consisting of a random copolymer block of propylene and 6-methyl-1,6-octadiene or 7-methyl-1,6-octadiene, a random copolymer block of propylene, ethylene and 6-methyl-1,6-octadiene or 7-methyl-1,6-octadiene, and a random copolymer block of ethylene and 6-methyl-1,6-octadiene or 7-methyl-1,6-octadiene; (12) a block copolymer consisting of a random copolymer block of ethylene and 6-methyl-1,6-octadiene or 7-methyl-1,6-octadiene, and a random copolymer block of propylene, ethylene and 6-methyl-1,6-octadiene or 7-methyl-1,6-octadiene; (13) a random copolymer of ethylene and 6-methyl-1,6-octadiene; (14) a random copolymer of ethylene, 6-methyl-1,6-octadiene and 7-methyl-1,6-octadiene; (15) a random copolymer of ethylene and 6-methyl-1,6-octadiene; (16) a random copolymer of ethylene, propylene and 6-methyl-1,6-octadiene or 7-methyl-1,6-octadiene; (-17) a random copolymer of ethylene, 1-butene and 6-methyl-1,6-octadiene or 7-methyl-1,6-octadiene; (18) a random copolymer of ethylene, 1-hexene and 6-methyl-1,6-octadiene or 7-methyl-1,6-octadiene; (19) a random copolymer of ethylene, 4-methyl-1-pentene and 6-methyl-1,6-octadiene or 7-methyl-1,6-octadiene; (20) a block copolymer consisting of a homopolymer block of ethylene, and a random copolymer block of ethylene, 6-methyl-1,6-octadiene or 7-methyl-1,6-octadiene; (21) a random copolymer of 1-butene and 6-methyl-1,6-octadiene or 7-methyl- 1,6-octadiene; (22) a random copolymer of 3-methyl-1-butene and 6-methyl-1,6-octadiene or 7-methyl-1,6-octadiene; (23) a random copolymer of 4-methyl-1-pentene and 6-methyl-1,6-octadiene or 7-methyl1,6-octadiene; and the like.

Among them particularly preferred examples include (a) a random copolymer of propylene and 7-methyl-1,6-octadiene; (b) a block copolymer consisting of a homopolymer block of propylene, and a random block of ethylene and 7-methyl-1,6-octadiene; (c) a random copolymer of ethylene and 7-methyl-1,6-octadiene; (d) a random copolymer of propylene, ethylene and 7-methyl-1,6-octadiene; (e) a block copolymer consisting of a random copolymer block of ethylene and 7-methyl-1,6-octadiene, and a random copolymer block of propylene and 7-methyl-1,6-octadiene in view of availability of α-olefin, easiness of preparing these copolymers and the like.

[Monomers capable of radical polymerization]

Monomers which are to be subjected to graft polymerization with an unsaturated copolymer are compounds capable of homopolymerization or copolymerization on the basis of the radical mechanism (simply referred to as monomer hereinafter).

Examples of these monomers include a vinyl monomers, vinylidene monomers, α,β-unsaturated carboxylic acid and derivatives thereof.

Most preferred example is an alkenyl benzoic monomer of the following general formula 3,

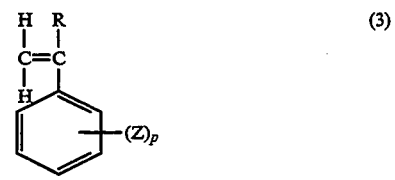

wherein R represents hydrogen, an alkyl group, an alkenyl group or a halogen atom; Z represents a vinyl group, chlorine, bromine, hydrogen or an alkyl group; and p is an integer from 0 to 5. Among them styrene is the most preferable monomer. Other radical polymeric monomers may be used as far as compatibility of styrene with a polyphenylene ether resin and/or a styrene resin, one component of the resin composition according to the present invention, is not lost. Representative monomers are unsaturated nitrile compounds such as acrylonitrile and the like, (meth)acrylic acid or derivatives thereof, maleic anhydride and compounds of maleimide series.

The amounts of these monomers used are in the range of one or more parts by weight to 300 or less parts by weight, preferably 5 to 200 parts by weight, and more preferably 10 to 150 parts by weight relative to 100 parts by weight of an unsaturated copolymer. The use of less than one part by weight barely leads to the improved effects according to the present invention, but on the other hand, it is difficult to obtain mechanical strength of unsaturated copolymers in cases of the use of more than 300 parts by weight.

[Preparation of graft modified copolymers]

The graft modified copolymers according to the present invention are prepared by polymerizing unsaturated copolymers with monomers capable of graft polymerization under the conventionally known conditions of radical graft polymerization. For example, the present invention uses the following methods: a method in which radiation such as gamma-ray or electron rays is irradiated under the coexistence of the unsaturated copolymers and monomers; a method in which monomers coexist after irradiating unsaturated copolymers with radiation; a method in which the graft polymerization is performed using organic or inorganic peroxide compounds or radical polymerization catalysts such as redox catalysts; and the like. Among these methods, the most preferred method is that in which monomers are impregnated to the resins in an aqueous suspensible dispersion in the presence of unsaturated copolymer particles, and subjected to the graft polymerization using radical polymerization catalysts, which is further described in the following.

Without any limitation on the size of unsaturated copolymer particles, these may be prepared by the synthesis process of the resin in the form of powder, or may be molded in the form of pellets by the synthesis of the resin using an extruder and the like. In the case of preparing in the form of pellets, the particles preferably have average sizes of about 1 to 5 mm to facilitate the impregnation of the monomers. In the case of preparing in the form of powder, if the average particle size is too small (i.g., 0.05 mm or less) cause fusing or aggregation of the particles during preparation of graft modified copolymers, but the fusing or aggregation can be prevented by selecting the amount to water, the stirring rate, and the kind or amount of suspending agents.

Preferred radical polymerization catalysts which are oil-soluble have a decomposition temperature, whose half-life is 10 hours (a 10-hour half-life temperature), of a range of 40° to 150° C. Particularly preferred radical polymerization catalysts have a range of 50° to 130° C. Examples of the radical polymerization catalysts include isobutyl peroxide, cumyl peroxyneodecanoate, diisopropyl peroxydicarbonate, diallyl peroxydicarbonate, cumyl peroxyneohexanoate, di(methoxyisopropyl)-peroxydicarbonate, di(2-ethylhexyl)peroxydicarbonate, t-butyl peroxyneodecanonate, t-butyl peroxyneohexnoate, 2,4-dichlorobenzoil peroxide, t-hexyl peroxypivalate, t-butyl peroxypivalate, 3,5,5-trimethylhexanoyl peroxide, octanoyl peroxide, cumyl peroxyoctoate, acetyl peroxide, t-butyl peroxy(2-ethylhexanoate), m-toluoyl peroxide, benzoyl peroxide, t-butyl peroxyisobutylate, 1,1-bis(t-butylperoxy)cyclohexane, t-butyl peroxymaleic acid, t-butyl peroxy-3,5,5-trimethylhexanoate, cyclohexanone peroxide, t-butylperoxyisopropyl carbonate, 2,5-dimethyl-2,5-di(benzoilperoxy)hexane, t-butyl peroxyacetate, 2,2-bis(t-butlyperoxy)butane, t-butyl peroxybenzoate, di-t-butyl di-peroxyisophthalate, methylethylketone peroxide, dicumyl peroxide, t-butyl cumyl peroxide, di-t-butyl peroxide, p-methane hydroperoxide, 2,5-dimethyl-2,5-di(t-butylperoxy)hexane-3,2,5-dimethylhexane-2,5-dihydroperoxide, cumene hydroperoxide, t-butyl hydroperoxide and the like.

Among them preferred examples include cumyl peroxyneohexanoate, t-butyl peroxyneodecanonate, t-butyl peroxyneohexnoate, 2,4-dichlorobenzoil peroxide, t-hexyl peroxypivalate, t-butyl peroxypivalate, 3,5,5-trimethylhexanoyl peroxide, octanoyl peroxide, acetyl peroxide, t-butyl peroxy(2-ethylhexanoate), benzoyl peroxide, t-butyl peroxyisobutylate, t-butyl peroxy-3,5,5-trimethylhexanoate, 2,5-dimethyl-2,5-di(-benzoilperoxy)hexane, t-butyl peroxyacetate, t-butyl peroxybenzoate, di-t-butyl peroxyisophthalate, 2,5-dimethyl-2,5-di(t-butylperoxy)hexane-3 and the like. Particularly preferred examples include t-butyl peroxypivalate, 3,5,5-trimethylhexanoyl peroxide, octanoyl peroxide, acetyl peroxide, benzoyl peroxide, t-butyl peroxy-3,5,5-trimethylhexanoate, 2,5-dimethyl-2,5-di(-benzoilperoxy)hexane, t-butyl peroxyacetate, t-butyl peroxybenzoate, di-t-butyl di-peroxyisophthalate and the like. It is possible to use concomitantly one or more of these radical polymerization catalysts.

Among these, catalysts that are dissolved in a suspension of a monomer are preferably used. After a monomer is impregnated with an unsaturated copolymer, these catalysts in organic solvents may be added all at once or portion by portion.

The amount of these radical polymerization catalysts used is generally 0.01 to 10 parts by weight, preferably 0.1 to 1 parts by weight relative to 100 parts by weight of a monomer. In cases of the use of less than 0.01 parts by weight of the catalysts, monomers may not be completely polymerized. The use of more than 10 parts by weight of the catalysts is not preferred because remarkable crosslinking reactions of unsaturated copolymers are caused, strong reactions occur so that the reaction temperatures are difficult to control, or remains of unreacted radical polymerization catalysts lead to adverse affects.

When molecular weight modification of part of a polymer consisting of monomers is required, a general method for modifying molecular weight can be utilized which is available for radical polymerization. For example, this object can be attained by adjusting polymerization temperature the amount of radical polymerization catalysts added, the amount of monomers used, or by adding molecular weight modifiers such as mercaptanes and 2,4-diphenyl-4-methyl-1-pentene.

Aqueous dispersive suspensions to be used in such a method are essentially identical to aqueous suspensions for aqueous suspension polymerization except that unsaturated copolymer particles are present in the system. That is, a solution containing the unsaturated copolymer particles and preferably a monomer solution in which radical polymerization catalysts have been previously dissolved are dispersed in an aqueous medium under stirring in the presence of suspending agents, e.g., water-soluble polymers such as polyvinyl alcohol, polyvinyl pyrrolidone and methyl cellulose, or slightly soluble inorganic matters such as calcium phosphate and magnesium oxide. The aqueous medium may be water only, a mixture of water and various water-soluble agents or a mixture of water and surfactants.

The unsaturated copolymer and monomer contents in the aqueous suspensions, which are selected appropriately as far as removal of reaction heat and prevention of fusing and the like can be assured, are generally 5 to 100 parts by weight and preferably 10 to 80 parts by weight of a total amount of unsaturated copolymers and monomers relative to 100 parts by weight of water. When modified unsaturated copolymers are prepared by the method, the aqueous suspensions are heated under the conditions in which monomers are not polymerized due to decomposition of the radical polymerization catalyst used, and monomers and radical polymerization catalyst are preferably impregnated in a solution containing unsaturated copolymer particles. The impregnation is preferably conducted by stirring or standing the aqueous medium until 80% or more, preferably 90% or more, of the monomer are impregnated or adhered. When more than 20% of a monomer which are not impregnated or adhered are present, characteristics of the desired modified unsaturated copolymer may not be satisfactorily obtained, because polymer particles of the monomer alone may be produced or dispersion of the monomer in the unsaturated copolymer may become ununiform in the next graft polymerization process.

Any impregnating temperature and time for a monomer can be selected under the above mentioned suitable conditions. For example, the temperature may be 3° to 50° C., and preferably 5 to 30° C., less than that of a 10-hour half-life temperature, and the time may be 10 minutes to 12 hours, and preferably 30 minutes to 10 hours.

The amount of monomer not impregnated or not adhered may be determined, for example, in accordance with the following methods. That is, an appropriate amount of a suspension is collected, which is filtered rapidly using a metal sieve of about 300 mesh, and amounts of unsaturated copolymer particles and a monomer dispersed in a liquid phase are measured. The percentage of the monomer which was not impregnated nor adhered is calculated from the obtained values and charged amounts.

After the impregnation process, a graft polymerization process is performed. In this process an radical polymerization catalyst is sufficiently decomposed and a monomer is polymerized by heating the suspension after impregnation preferably under stirring. Generally, conditions are selected so that the conversion rate (i.e., polymerization rate) should be usually 50% or more, preferably 75% or more, and more preferably 90% or more in order to facilitate collection or removal of unreacted monomers from the aqueous suspension or prepared graft modified copolymer particles. When the 10-hour half-life temperature and polymerization are temperature referred to as $T_{10}°$ C. and $T°$ C. respectively, T is generally in a range of $T_{10}-30°$ C.$<T \leq T_{10}+80°$ C., and preferably in a range of $T_{10}°$ C.$\leq T \leq +70°$ C. In view of prevention of denature such as the decomposition or crosslinking of unsaturated copolymers, or aggregation or fusing of prepared unsaturated copolymer particles, T is preferably 150° C. or less, more preferably 140° C. or less. Although any temperature can be selected so as to attain the above mentioned monomer conversion, it is generally 30 minutes to 50 hours, and preferably about 1 to 24 hours. The polymerization may be performed in a single step at a selected temperature or in several steps in different temperatures. The reaction products are filtered with or without cooling, and if necessary, are dried after washing with water, mineral acid solutions, alkaline solutions and the like.

Combination of component A, component B and component C

Another factor which defines the use of the resin composition of the present invention is the amount ratios of the above mentioned component A, component B and component C. These ratios are selected on the basis of the required performance of the final molded products. Although such properties as molding properties, mechanical strength, high-temperature rigidity and the like are respectively adjusted in accordance with the previously described characteristics of each component and by increasing or decreasing the present ratios of them in most cases, it is often difficult to make properties relationship of, e.g., melt-molding properties and high-temperature rigidity to be highly consistent, which may be inconsistent from general discussion on their mechanisms for developing the properties. For practical purposes, the ratios are generally selected by keeping various properties such as molding properties, mechanical strength and high-temperature rigidity in balanced.

When a polyphenylene ether resin and a styrene resin coexist in the final composition as component A, an amount ratio is preferably selected from 40 to 100% by weight of a polyphenylene ether resin relative to 0 to 60% by weight of a styrene series resin, and more preferably 60 to 100% by weight of a polyphenylene ether resin.

An amount ratio of such component A and a crystalline polyolefin resin as component B is selected from 10 to 90 parts by weight, preferably 20 to 80 parts by weight, and more preferably 30 to 70 parts by weight of component A; and 10 to 90 parts by weight, preferably 20 to 80 parts by weight, and more preferably 30 to 70 parts by weight of component B. One to 50 parts by weight, and preferably 5 to 30 parts by weight of component C are used relative to a total amount of 100 parts by weight of component A and component B.

In cases where an amount ratio of component A and component B is greater than 9:1, properties of component A, e.g., high-temperature rigidity become improved, but the use of the resins is limited due to the decreased melt-molding properties and resistance to organic solvents. On the other hand, in cases where an amount ratio of component A and component B is smaller than 1:9, the melt-molding properties are improved, but performance of the resins as an engineering resin is not satisfactory because of decreased high-temperature rigidity. When an amount of component C present in the resin is less than one part by weight, affinity modifying effects are not effectively obtained. When that is more than 50 parts by weight, affinity modifying effects are saturated and high-temperature rigidity is rather decreased.

Additional components

If necessary, other additional components can be added to the resin composition of the present invention in addition of the above mentioned essential components within a range that does not harm the effects according to the present invention.

For example, to a polyolefin resin can be added additives such as well-known antioxidants, climate resistance modifiers, nucleating agents, flame retarders and slip agents as additional components; and to the polyphenylene ether resin and the styrene series resin can be added well-known antioxidants, climate resistance modifiers, plasticizers, flow property modifiers, parting agents and the like. Furthermore, organic or inorganic fillers, reinforcing agents, in particular glass fibers, mica, talc, precipitated calcium carbonate, silica, wollastonite, potassium titanate whisker and the like are useful for improving rigidity, heat resistance, dimensional accuracy, dimensional stability and the like. For practical applications, such well-known compounds as polyolefin waxes, polystyrene waxes, ester compounds and acid amide compounds can be used as coloring agents and dispersants thereof.

Methods for mixing in preparation of the compositions

In preparation of the resin compositions of the present invention, the following methods can be utilized: a method for kneading the above mentioned components using various kneaders such as uniaxial extruders, biaxial extruders and Banbury mixers; a method in which solvents are removed after mixing a solution or suspension containing the components; or a method in which solvents are collected by precipitating and filtering off after addition of common non-media. The components can be mixed in any possible order, though it is desirable to mix all components at the same time from an economic point of view. When the components are mixed using a melt-kneading method, a method in which all components are mixed in decreasing order of their viscosity is also known.

EXAMPLES

Methods of the present invention are illustrated with reference to the following examples, but it is not intended to limit the invention thereby.

First of all, preparation examples of graft modified copolymers will be illustrated.

[Preparation Example 1]

a) Preparation of an unsaturated copolymer

After the inner part of a one-liter autoclave was replaced by propylene, 300 ml of n-heptane was charged and 0.9 g of triethylaluminium, 0.4 g of diphenyldimethoxy silane, and 0.10 g of a solid titanium catalyst containing magnesium were added in this order. Nest 65N ml of hydrogen was added, then propylene was injected, and the solution was stirred under 0.5 kg/cm$^2$ G at 50° C. Further 180 ml of 7-methyl-1,6-octadiene was added, and then polymerization was performed under 7 kg/cm$^2$ G at 70° C. to obtain a dry powder of 185 g. The bulk density of the powder was 0.48 g/cc.

The MFR of the unsaturated copolymer was 1.7 g/10 min. Analysis of the unsaturated copolymer by H$^1$-NMR indicated that the 7-methyl-1,6-octadiene content was 3.3 mole %, there was no chain of diene monomer units, and the copolymer had a 1,2-addition structure.

b) Pelletizing of the unsaturated copolymer

One hundred parts by weight of the unsaturated copolymer obtained above were compounded with 0.05 part by weight of 2,6-di-t-butyl-p-cresol as an additive, and pelletized using a uniaxial granulating machine at 230° C.

c) Preparation of a graft modified copolymer

To a one-liter autoclave 495 ml of water, 9.9 g of tricalcium phosphate as a suspending agent and 0.016 g of sodium dodecylbenzenesulphonate as a suspending auxiliary were introduced. To the resultant solution 50 g of the pelletized unsaturated copolymer consisting of propylene and 7-methyl-1,6-octadiene was added, and suspended by stirring. To the suspension was added a solution in which 0.1 g of t-butyl peroxybenzoate as a radical polymerization catalyst was dissolved in 25 g of styrene. The styrene containing the radical polymerization catalyst was then impregnated with the unsaturated copolymer pellets in an autoclave at a constant temperature of 90° C. for one hour while stirring. Then polymerization was performed in the autoclave at an increased temperature of 105° C. for 3 hours, and completed at a further increased temperature of 140° C. for 1 hour.

After cooling to room temperature, the contents were removed, nitric acid added thereto until a pH of 2.5 was attained in the water layer, the thus prepared graft modified copolymer was filtered off and washed and then dried under a reduced pressure. This copolymer is referred to as graft modified copolymer 1.

Three grams of the graft modified copolymer were dissolved in 100 ml of heated xylene, reprecipitated with a large amount of methylethyl ketone, filtered off and washed and then dried under a reduced pressure to obtain a purified graft modified copolymer.

Measurement by infrared spectrophotometry indicated the styrene content of the graft modified copolymer was 12.4% by weight.

[Preparation Example 2]

The same polymerization process was performed using the same catalyst as in Preparation Example 1 except that the volume of 7-methyl-1,6-octadiene was changed to 106 ml. As a result, 194 g of dried powder was obtained. The unsaturated copolymer had a MFR of 1.7 g/10 min and a 7-methyl-1,6-octadiene content of 2.7 mole %, and did not have a chain of the diene monomer units but had a 1,2-addition structure. The procedure in Preparation Example 1 was repeated using this unsaturated copolymer. The thus obtained copolymer is referred to as graft modified copolymer 2. The styrene content of the graft modified copolymer was 8.8% by weight.

[Preparation Example 3]

The same polymerization process was repeated as in Preparation Example 2 except that the amount of t-butyl peroxybenzoate of 0.1 g as a radical polymerization catalyst was changed to 0.22 g. The thus obtained copolymer is referred to as graft modified copolymer 3. The styrene content of the graft modified copolymer was 7.6% by weight.

[Preparation Example 4]

After the inner part of a one-liter autoclave was replaced by propylene, 400 ml of a mixture of 4-methyl-1,4-hexadiene and 5-methyl-1,4-hexadiene (8:2, molar ratio) was charged and 0.9 g of triethylaluminium, 0.4 g of diphenyldimethoxy silane, and 0.4 g of the same solid titanium catalyst containing magnesium as in Preparation Example 1 were added in this order. Next 700N ml of hydrogen was added, then propylene was injected, and the solution was stirred under 2.5 kg/cm$^2$ G at 25° C. Further, the temperature was raised by injecting propylene, and then polymerization was performed under 8.3 kg/cm$^2$ G at 65° C. to obtain 130 g of dry powder. The bulk density of the powder was 0.41 g/cc.

The MFR of the unsaturated copolymer was 3.0 g/10 min, and the methyl-1,4-hexadiene content was 3.5% by mole. The same procedure was repeated using the unsaturated copolymer as in Preparation Example 2. The copolymer is referred to as graft modified copolymer 4. The styrene content of the graft modified copolymer was 11.2 mole %.

[Examples 1 to 3]

A polypropylene resin (Mitsubishi Petrochemical Co., Ltd.; trade name, TA8), poly(2,6-dimethyl-1,4-phenylene ether) (Nippon Polyether Co., Ltd.) with an intrinsic viscosity of 0.4 dl/g in chloroform at 30° C., and the graft modified copolymers 1 to 3 were measured as indicated in Table 1 so as to attain a total amount of 45 g, and then the composition was melt kneaded using a Laboplastomill (Toyoseiki Co., Ltd) at 280° C. for 5 minutes. Without any limitation on stabilizers during kneading, 0.2 part of 2,6-di-t-butyl-p-cresol and 0.1 part of tetrakis[(methylene(3,5-di-t-butyl-4-hydroxyhydrocinnamate)]methane were added.

After kneading, the composition was compression-molded to obtain a sheet having a thickness of 2 mm, from which test pieces having a predetermined size were excised.

For testing their rigidity, the pieces were subjected to the flexural stiffness test in accordance with JIS-K-7106 and ASTM-D747 at 23° C. The impact resistances of these pieces were measured using an Izod impact testing machine in accordance with JIS-K 7110, in which 2 mm thick pieces were stacked in piles of 3. The results are shown in Table 1.

[Comparative Example 1]

A graft modified copolymer was prepared and tested in the same manner as in the above mentioned Examples except that the graft modified copolymer 4 obtained from Preparation Example 4 was used. The results are shown in Table 1.

[Comparative Example 2]

The preparation and tests were performed on the composition as shown in Table 1 in the same manner as in the above mentioned Examples except that a graft modified copolymer was not used. The results are shown in Table 1.

TABLE 1

| Composition (parts by weight) | Example 1 | Example 2 | Example 3 | Comparative Example 1 | Comparative Example 2 |
|---|---|---|---|---|---|
| (component a) polyphenylene ether | 50 | 50 | 50 | 50 | 50 |
| (component b) polypropylene | 50 | 50 | 50 | 50 | 50 |
| (component c) | | | | | |
| graft modified copolymer (1) | 15 | — | — | — | — |
| graft modified copolymer (2) | — | 15 | — | — | — |
| graft modified copolymer (3) | — | — | 15 | — | — |
| graft modified copolymer (4) | — | — | — | 15 | — |
| Physical Property | | | | | |
| Flexural stiffness (kgf/cm$^2$, 23° C.) | 13100 | 13000 | 13600 | 13400 | 12800 |
| Izod impact strength (kgf · cm/cm$^2$, 23° C.) | 37.7 | 25.7 | 23.5 | 16.0 | 3.7 |

As shown in Table 1, it is indicated that the resin composition of the present invention has excellent mechanical strength, particularly in impact resistance, and has a more balanced set of properties than those of Comparative examples.

By preparing the resin composition of the present invention in which a polyphenylene ether resin, a polyolefin resin and a graft modified copolymer modified with a specified monomer capable of radical polymerization under the conditions of radical graft polymerization are compounded, the present invention can be applied in fields which require high performance such as for structural components for automobiles and electrical products, because there is no great loss in the heat resistance and mechanical strength characteristics of polyphenylene ether resins, and the molding properties and the resistance to organic solvents characteristics of polyolefin resins, while at the same time, their impact resistance is remarkably improved.

What is claimed is:

1. A resin composition consisting essentially of the following components A, B and C:
    component A: 10 to 90 parts by weight of a resin consisting of 40 to 100% by weight of a polyphenylene ether resin and 0 to 60% by weight of a styrene series resin;
    component B: 10 to 90 parts by weight of a crystalline polyolefin resin; and
    component C: 1 to 50 parts by weight of a styrene graft modified copolymer relative to a total amount of 100 parts by weight of the component A and component B, in which 100 parts by weight of an unsaturated copolymer consisting of at least one α-olefin having 3 to 12 carbon atoms and at least one chain nonconjugated diene of the following general formula 1, the chain nonconjugated diene content is 0.05 to 50 mole %, and is modified with 1 to 300 parts by weight of styrene by suspension polymerization, wherein and unsaturated copolymer is impregnated with styrene by keeping the unsaturated copolymer in 1 to 300 parts by weight of styrene containing a polymerization catalyst having a 10-hour half-life temperature ($T_{10}$) of 40° to 150° C., for 10 minutes to 12 hours, at a temperature of 30° to 50° C. lower than said $T_{10}$, more than 80% by weight of styrene being impregnated, and then a suspension polymerization is carried out at a temperature T defined by the equation: $T_{10}-30 < T < T_{10}+80$,

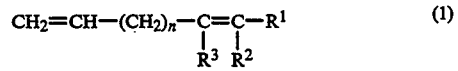

wherein n is an integer from 2 to 10, $R^1$ represents an alkyl group having 8 or less carbon atoms, and $R^2$ and $R^3$ represent independently hydrogen or an alkyl group having 8 or less carbon atoms, wherein the unsaturated copolymer has a flexural modulus of 500 to 20,000 kg/cm$^2$.

2. The resin composition as claimed in claim 1 wherein the polyphenylene ether resin of component A is a polymer comprising one or more monomers selected from the group consisting of poly-2,6-dimethyl-1,4-phenylene ether, a large portion of 2,6-dimethyphenol and a small portion of 2,3,6-trimethylphenol, o- or p-cresol, 2,2'-bis(3,5-dimethyl-4-hydroxy)propane, and 3,3',5,5'-tetramethyl-4,4'-dihydroxybisphenyl.

3. The resin composition as claimed in claim 1 or 2 wherein the polyphenylene ether resin of the component A has an intrinsic viscosity of 0.1 to 0.9 dl/g at a temperature of 30° C. in a chloroform solution.

4. The resin composition as claimed in claim 1 wherein the crystalline polyolefin resin of component B is a homopolymer of polyethylene or polypropylene, and a propylene/ethylene or propylene/α-olefin copolymer comprising propylene as a main component, whose degree of crystallization is 5% or more.

5. The resin composition as claimed in claim 1 wherein the α-olefin of component C is one or more α-olefins selected from the group consisting of ethylene, propylene, 1-butene, 1-hexene, 3-methyl-1-butene, 3-methyl-1-pentene, 4-methyl-1-pentene and 3-methyl-1-hexene.

6. The resin composition as claimed in claim 1, wherein the chain nonconjugated dienes of component C is one or more nonconjugated dienes selected from the group consisting of 1,5-heptadiene, 1,5-octadiene, 5-methyl-1,5-heptadiene, 6-methyl-1,5-heptadiene, 2-methyl-1,5-hexadiene, 1,6-octadiene, 6-methyl-1,6-octadiene, 7-methyl-1,6-octadiene, 2-methyl-1,6-heptadiene, 6-methylidene-1-octene, 6-ethyl-1,6-octadiene, 6,7-dimethyl-1,6-octadiene, 1,6-nonadiene, 6-ethyl-1,6-nonadiene, 7-methyl-1,6-nonadiene, 6-ethyl-1,6-nonadiene, 7-methyl-1,6-nonadiene, 7-methyl-1,6-decadiene, 1,7-nonadiene, 7-methyl-1,7-nonadiene, 8-methyl-1,7-nonadiene, 2-methyl-1,7-octadiene, 8-methyl-1,8-decadiene and 9-methyl-1,8-decadiene.

7. The resin composition as claimed in claim 1, wherein the chain nonconjugated diene is 6-methyl-1,6-octadiene.

8. The resin composition as claimed in claim 1, wherein the chain nonconjugated diene is 7-methyl-1,6-octadiene.

* * * * *